United States Patent
Li et al.

(10) Patent No.: US 7,778,599 B2
(45) Date of Patent: Aug. 17, 2010

(54) AGGREGATED CHANNEL FEEDBACK

(75) Inventors: Qinghua Li, Sunnyvale, CA (US);
Guangjie Li, Beijing (CN); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 838 days.

(21) Appl. No.: 11/617,403

(22) Filed: Dec. 28, 2006

(65) Prior Publication Data

US 2007/0254597 A1 Nov. 1, 2007

Related U.S. Application Data

(60) Provisional application No. 60/796,812, filed on May 1, 2006.

(51) Int. Cl.
*H04B 1/00* (2006.01)
*H04B 7/00* (2006.01)
*H04B 17/00* (2006.01)

(52) U.S. Cl. .................. 455/39; 455/67.13; 455/69

(58) Field of Classification Search .......... 455/39, 455/63.1, 67.11, 67.13, 68–69, 101, 561–562.1
See application file for complete search history.

(56) References Cited

U.S. PATENT DOCUMENTS

| | | | |
|---|---|---|---|
| 6,834,076 B2 * | 12/2004 | Xu | 375/211 |
| 7,174,178 B2 * | 2/2007 | Bergel | 455/502 |
| 7,433,434 B2 * | 10/2008 | Gifford et al. | 375/350 |
| 7,492,722 B2 * | 2/2009 | Pietraski et al. | 370/252 |
| 7,548,730 B2 * | 6/2009 | Waxman | 455/69 |
| 7,697,948 B2 * | 4/2010 | Wan et al. | 455/509 |
| 2002/0023145 A1 * | 2/2002 | Orr et al. | 709/219 |
| 2002/0054607 A1 * | 5/2002 | Morelos-Zaragoza et al. | 370/470 |
| 2003/0157900 A1 | 8/2003 | Gaal et al. | |

FOREIGN PATENT DOCUMENTS

| | | |
|---|---|---|
| WO | 2004042982 A2 | 5/2004 |
| WO | 2006031485 A1 | 3/2006 |

OTHER PUBLICATIONS

International Search Report, issued in Application No. PCT/US2007/067901, mailed on Sep. 27, 2007.

* cited by examiner

*Primary Examiner*—Simon D Nguyen
(74) *Attorney, Agent, or Firm*—Schwabe, Williamson & Wyatt, P.C.

(57) ABSTRACT

Embodiments of methods and apparatus for providing aggregated feedback from a subscriber station to a base station are generally described herein. Some embodiments may include a channel response predictor to predict channel responses for future feedback periods and a feedback information generator to aggregate feedback information, generated based on the predicted channel responses, into an aggregated information block that is to be transmitted to a base station. Other embodiments may be described and claimed.

21 Claims, 4 Drawing Sheets

AGGREGATED CHANNEL FEEDBACK

RELATED APPLICATION

This is a non-provisional application of provisional application 60/796,812, titled "Methods and Apparatus for Providing A Feedback Aggregation System Associated with Multiple-Input-Multiple-Output System," filed on May 1, 2006. This non-provisional application claims priority to the 60/796,812 provisional application.

TECHNICAL FIELD

The present disclosure relates generally to wireless communication systems, and more particularly, to methods and apparatus for providing aggregated channel feedback.

BACKGROUND

As wireless communication becomes more and more popular at offices, homes, schools, etc., different wireless technologies and applications may work in tandem to meet the demand for computing and communications at anytime and/or anywhere. For example, a variety of wireless communication networks may co-exist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide the broadest range as such networks are widely deployed in cellular infrastructure. Although each of the above-mentioned wireless communication networks may support different usages, co-existence among these networks may provide a more robust environment with anytime and anywhere connectivity.

DETAILED DESCRIPTION

In general, methods and apparatus for providing a feedback aggregation system associated with a MIMO system are described herein. The methods and apparatus described herein are not limited in this regard.

Figure 1:
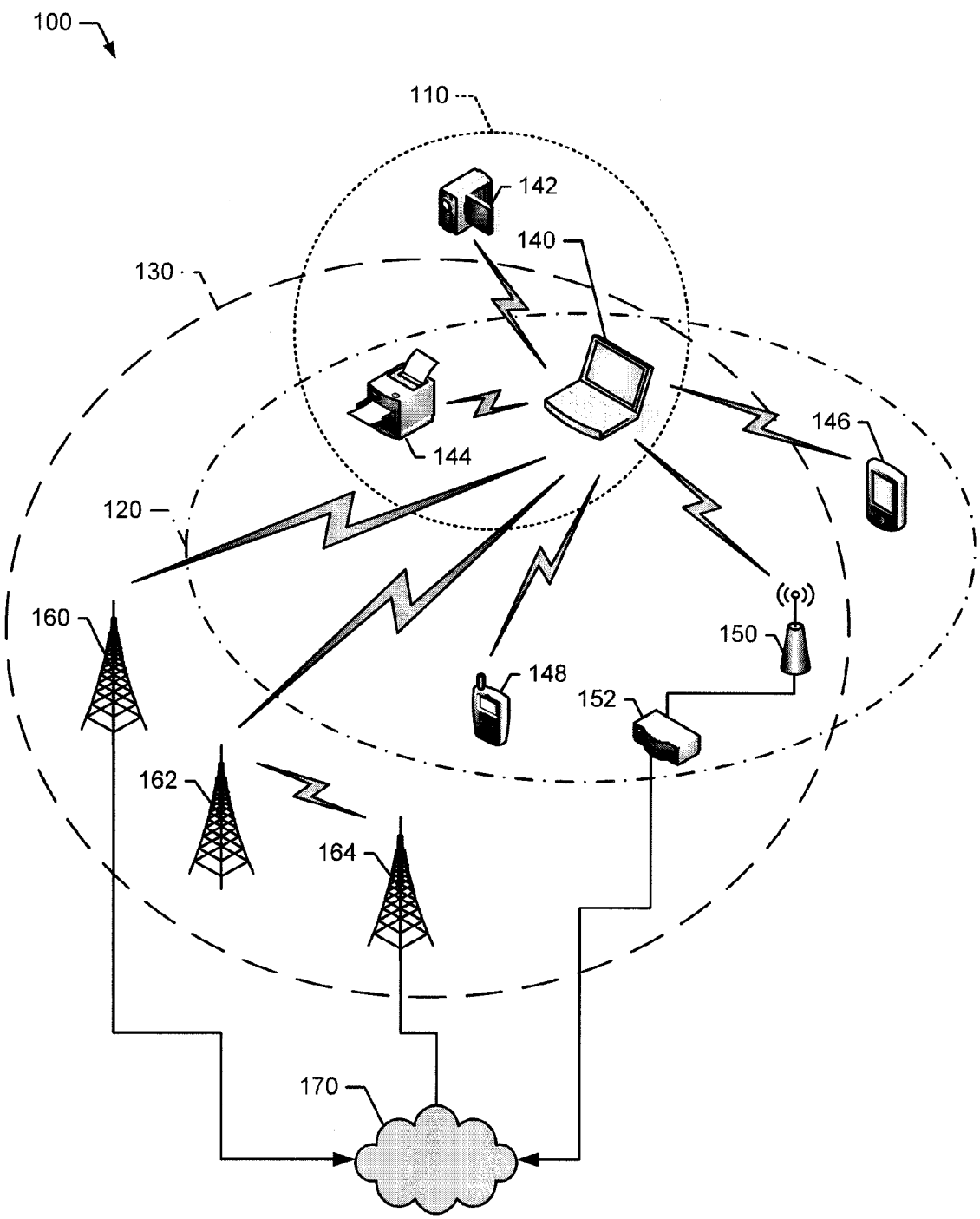
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
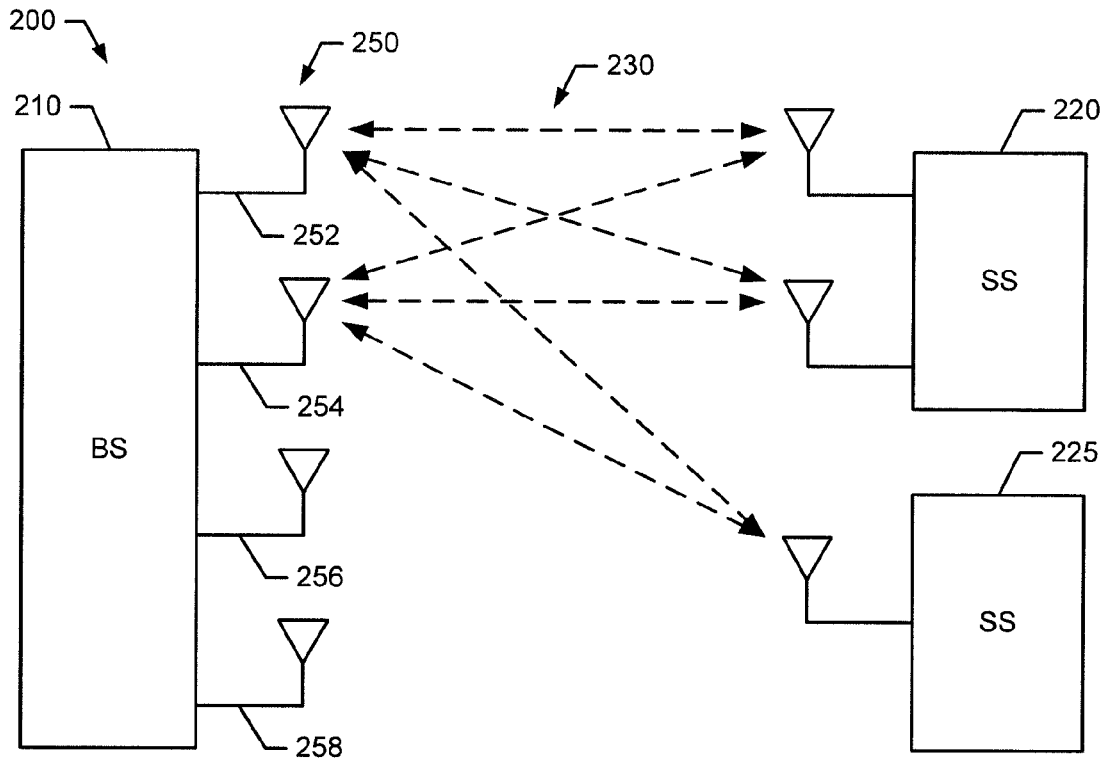
FIG. 2 is a block diagram representation of an example multiple-input-multiple-output (MIMO) system of the example wireless communication system of FIG. 1.

Referring to FIG. 2, an example wireless MIMO system 200 may include a base station 210 and one or more subscriber stations, generally shown as 220 and 225. The wireless MIMO system 200 may include a point-to-point MIMO system and/or a point-to-multiple point MIMO system. For example, a point-to-point MIMO system may include the base station 210 and the subscriber station 220. A point-to-multiple point MIMO system may include the base station 210 and the subscriber station 225. The base station 210 may transmit data streams to the subscriber stations 220, 225 simultaneously. For example, the base station 310 may transmit two data streams to the subscriber station 220 and one data stream to the subscriber station 225. Although FIG. 2 may depict one subscriber station, the wireless MIMO system 200 may include additional subscriber stations.

The base station 210 may transmit two or more data streams over four transmit antennas 250, generally shown as 252, 254, 256, and 258. Although FIG. 2 depicts four transmit antennas, the base station 210 may include additional or fewer transmit antennas. The methods and apparatus described herein are not limited in this regard.

In general, channel state feedback is employed in most WMAN systems. The feedback can be for transmit beamforming, user scheduling, modulation coding selection, etc. The feedback is usually sent by the subscriber station 220 (or UE) to the base station 210 (or Node B) through a dedicated feedback channel (e.g., control channel). Since the dedicated channel is designed to be robust in various channel conditions, it is heavily coded. Because the number of bits is small (i.e., a few bits for each feedback), the coding efficiency is very low to achieve the robust protection. It is desirable to aggregate multiple feedbacks and encode them together and send through an ordinary data channel. However, the feedback has to be sent timely to report the current channel state in the legacy system. It prevents the subscriber station 220 from aggregation.

In various embodiments, the subscriber station 220 predicts the channel responses of several original feedback periods ahead and generates the feedback information for the periods. The feedback information can be for transmit beamforming, user scheduling, modulation coding selection, etc. The information can be compressed by exploiting the correlation among them and channel coded jointly. The aggregated information block enables efficient coding. The coded block can be sent by normal data channel that has a longer latency than the dedicated feedback channel, because the latency can be compensated by the prediction. Therefore, the prediction not only enables the aggregation for efficient coding but also allows the feedback sending over low-cost data channel.

As noted above, channel state feedback is employed in most WMAN system. The feedback can be for transmit beamforming, user scheduling, modulation coding selection, etc. For examples, the channel quality indicator (CQI) feedback specifies the channel quality; power control feedback tells the base station to increase or decrease the transmission power; beamforming feedback provides the beamforming vectors for the base station to direct energy to the mobile. The feedbacks are usually sent by the subscriber station 220 (or UE) to the base station 210 (or Node B) through a dedicated feedback channel (e.g., control channel 230 as shown in FIG. 2). Since the dedicated channel is designed to be robust in various channel conditions, it is heavily coded. Because the number of bits is small i.e. a few bits for each feedback, the coding efficiency is very low to achieve the robust protection. For example, power control feedback may use one bit and there is no efficient channel coding to protect it, while there are many strong codes to protect 1 k bits jointly. For another example, H-ARQ acknowledgement packet in HSDPA, which is sent through HS-DPCCH channel, has two information bits and the coded block has ten bits. The code rate is very low ⅕. Therefore, the efficiency of the dedicated channel is low or its usage is costly. In addition, the bandwidth of the feedback channel is limited in the system, and can't support a large bandwidth of feedback. It is desirable to aggregate multiple feedbacks and code them together and send them through an ordinary data channel. However, the feedback has to be sent timely to report the current channel state for the legacy system. It prevents the mobile station from aggregation.

Figure 3:
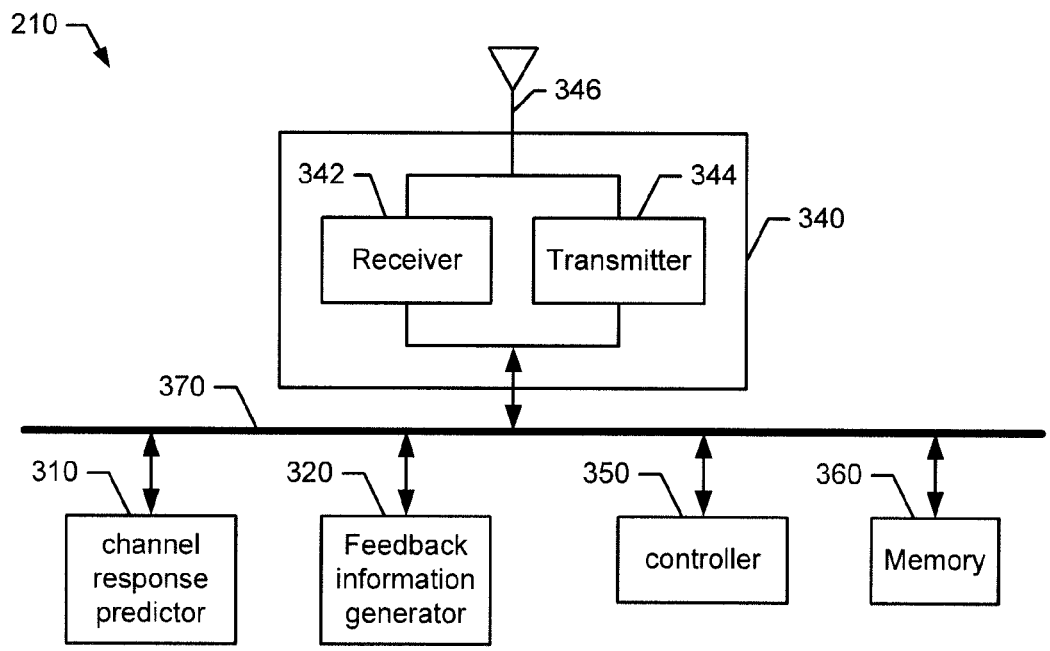
FIG. 3 is a block diagram representation of an example subscriber station of the example MIMO system of FIG. 2.

In the example of FIG. 3, the subscriber station 220 may include a channel response predictor 310, a feedback information generator 320, a network interface device (NID) 340, a processor 350, and a memory 360. The channel response predictor 310, the feedback information generator 320, the NID 340, the processor 350, and the memory 360 may be operatively coupled to each other via a bus 370. While FIG. 3 depicts components of the subscriber station 220 coupling to each other via the bus 370, these components may be operatively coupled to each other via other suitable direct or indirect connections (e.g., a point-to-point connection or a point-to-multiple point connection).

The NID 340 may include a receiver 342, a transmitter 344, and an antenna 346. The subscriber station 220 may receive and/or transmit data via the receiver 342 and the transmitter 344, respectively. The antenna 346 may include one or more directional or omni-directional antennas such as dipole antennas, monopole antennas, patch antennas, loop antennas, microstrip antennas, and/or other types of antennas suitable for transmission of radio frequency (RF) signals. Although FIG. 3 depicts a single antenna, the subscriber station 220 may include additional antennas. For example, the subscriber station 220 may include a plurality of antennas to implement a multiple-input-multiple-output (MIMO) system.

Although the components shown in FIG. 3 are depicted as separate blocks within the subscriber station 220, the functions performed by some of these blocks may be integrated within a single semiconductor circuit or may be implemented using two or more separate integrated circuits. For example, although the receiver 342 and the transmitter 344 are depicted as separate blocks within the NID 340, the receiver 342 may be integrated into the transmitter 344 (e.g., a transceiver). The methods and apparatus described herein are not limited in this regard.

In general, the subscriber station 220 predicts the channel responses of several original feedback periods and generates the feedback information for the periods. The feedback information can be for transmit beamforming, user scheduling, modulation coding selection, etc. The information can be compressed by exploiting the correlation among them and then channel coded jointly. The aggregated information block enables efficient coding due to the increased length. The coded block can be sent by an ordinary data channel that has a longer latency than the dedicated feedback channel, because the latency can be compensated by the prediction. The ordinary data channel has a greater bandwidth than the dedicated feedback channel. The ordinary data channel can use the efficient MIMO transmission, while the dedicated channel usually uses the less efficient single antenna transmission. Therefore, the prediction not only enables the aggregation for efficient coding but also allows the feedback sending over low-cost data channel.

Figure 4:
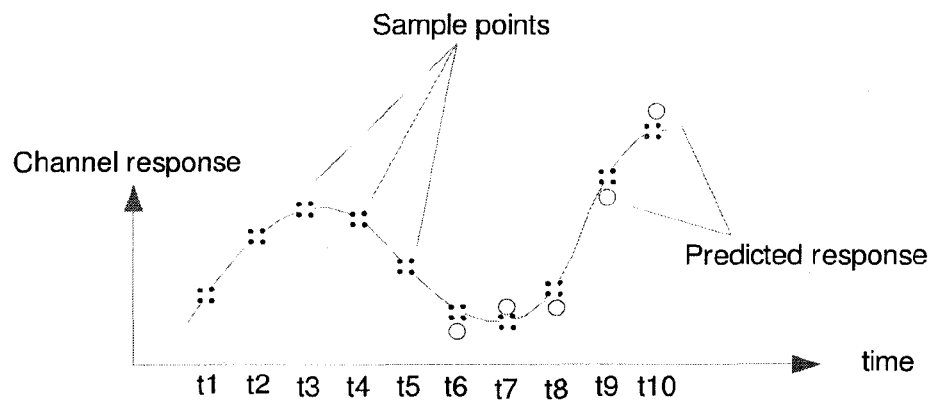
FIG. 4 is a timing diagram representation of the example subscriber station of FIG. 3.

Turning to FIG. 4, the subscriber station 220 samples the channel response at time $t_i$, i=1, ..., 10. The subscriber station 220 may predict channel responses at $t_8$, $t_9$, and $t_{10}$ at time $t_4$ after observing $t_1$, $t_2$, $t_3$, and $t_4$. The predictions may contain prediction errors. The predicted channel responses are bundled, compressed, coded into one block, and fed back to the base station using a MIMO channel designed for ordinary uplink traffic. Because there is an interval from $t_4$ to $t_8$ when the feedback information starts to be used by the base station (e.g., the base station 210 of FIG. 2), the subscriber station 220 has the flexibility to find an opportunity to send the information within the interval less the processing delay at the base station 210. The sample points and the predicted points are not necessary to coincide in time and they can be offset and have different periods. In the legacy system, the subscriber station 220 samples at time $t_i$ and feeds back the sample at the early chance without prediction.

Since the feedback needs to be sent within some latency depending on the channel prediction capability, the subscriber station 220 may attach the feedback with other uplink traffics in a piggy back way within the time window offered by the prediction. For example, the feedback may be jointly coded with H-ARQ ACK or TCP/IP ACK or even uplink data packet. The subscriber station 220 be may remove some partition of the uplink data packet to accommodate the feedback. If the time window is large enough, there is a high chance that the other traffics occur.

If channel state information including beamforming and CQI of multiple frequency sub-bands are needed to be fed back, they may be jointly compressed, coded and sent in one block.

Figure 5:
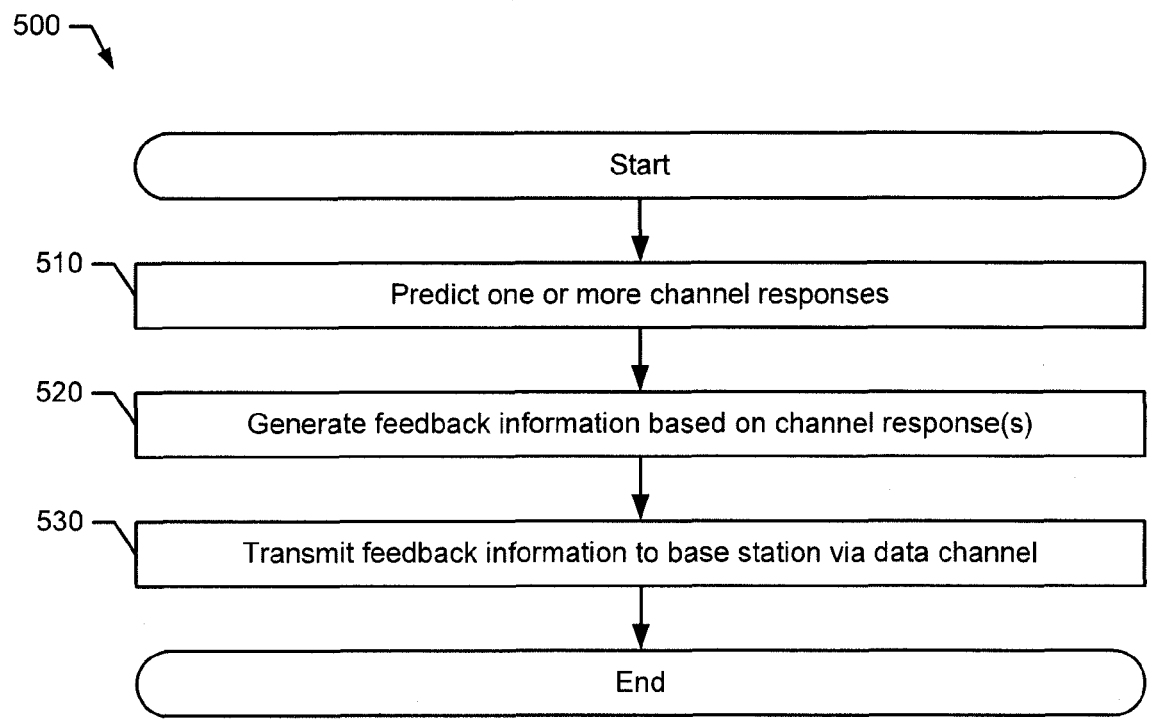
FIG. 5 is a flow diagram representation of one manner in which the example subscriber station of FIG. 3 may be configured.

FIG. 5 depicts one manner in which the subscriber station 220 may be configured to provide a feedback aggregation system. The example process 500 of FIG. 5 may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 5, these actions may be performed in other temporal sequences. Again, the example process 500 is merely provided and described in conjunction with the system and apparatus of FIGS. 2 and 3 as an example of one way to provide a feedback aggregation system.

In the example of FIG. 5, the process 500 may begin with the subscriber station 220 (e.g., via the channel response predictor 310) predicting one or more channel responses (block 510). Each channel response is associated with a feedback period. For example, the channel response predictor 310 may sample channel response during each feedback period. Based on the one or more channel responses, the subscriber station 220 (e.g., via the feedback information generator 320) may generate feedback information based on the one or more channel responses. In one example, the feedback information generator 320 may bundle (also referred to as aggregate) the channel response(s), compress the bundled/aggregated channel response(s), and code the compressed channel response(s). The subscriber station 220 may transmit the feedback information to a base station via a data channel for uplink traffic. The methods and apparatus described herein are not limited in this regard.

In general, the methods and apparatus described herein may provide efficient feedback in time varying channels. The efficiency is provided by channel prediction, information bit aggregation, and/or usage of low cost data channel. The methods and apparatus described herein are not limited in this regard.

Although the methods and apparatus described herein may be associated with the Third Generation Partnership Project (3GPP) for the Long Term Evolution (LTE), the methods and apparatus described herein may be readily applicable with other suitable wireless technologies, protocols, and/or standards. The methods and apparatus described herein are not limited in this regard.

Figure 6:
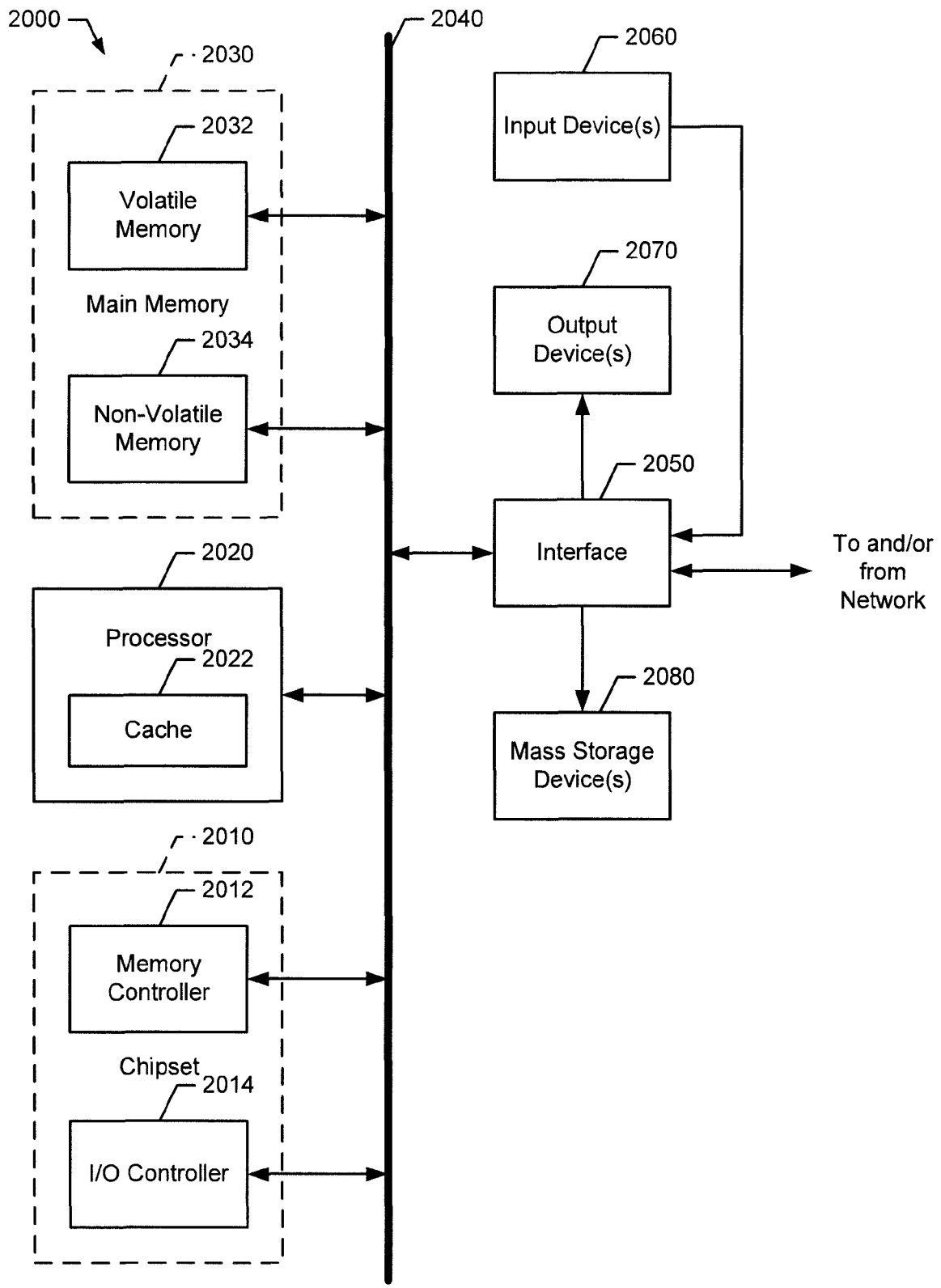
FIG. 6 is a block diagram representation of an example processor system that may be used to implement the example subscriber station of FIG. 3.

FIG. 6 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 6 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of wired or wireless interface. In various embodiments, interface unit 2050 is endowed with the earlier described channel response predictor 310 and/or feedback information generator 320.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. An apparatus comprising:
   a channel response predictor to predict for a subscriber station hosting the apparatus, a plurality of channel responses for a first plurality of points in time corresponding to a plurality of future feedback periods for the subscriber station to provide feedback to a base station; and
   a feedback information generator coupled to the channel response predictor to receive the predicted channel responses, to generate feedback information for each of the plurality of future feedback periods based on the predicted channel responses, to aggregate the feedback information for each of the plurality of future feedback periods into an aggregated information block, and to code the aggregated information block into a single transmission block to be transmitted, to the base station, in an uplink data channel.

2. The apparatus as defined in claim 1, wherein the channel response predictor is configured to sample another plurality of channel responses at a second plurality of points in time preceding the first plurality of points in time, and to predict the plurality of channel responses based at least in part on the sampled another plurality of channel responses.

3. The apparatus as defined in claim 1, wherein the feedback information includes at least two types of feedback information selected from a group consisting of channel quality feedback, power control feedback, and beamforminq feedback.

4. The apparatus as defined in claim 3, wherein the feedback information generator is configured to compress the aggregated information block based at least in part on correlation between the predicted channel responses.

5. The apparatus as defined in claim 4, wherein the feedback information generator is configured to jointly code the compressed aggregated information block.

6. The apparatus of claim 1, wherein the feedback information generator is to code the aggregated information block into the single transmission block to be transmitted over a plurality of transmit antennas to the base station in the uplink data channel.

7. The apparatus of claim 1, wherein the feedback information generator is further configured to aggregate the feedback information and uplink data in the aggregated information block.

8. The apparatus of claim 1, wherein the feedback information includes beamforming feedback and/or channel quality feedback for multiple frequency sub-bands.

9. An article of manufacture comprising:
a storage medium; and
a plurality of programming instructions stored therein, and configured to program a communication module of a subscriber station to enable the communication module
to predict for the subscriber station a plurality of channel responses for a first plurality of points in time corresponding to a plurality of future feedback periods for the subscriber station to provide feedback to a base station;
to generate for the subscriber station feedback information for each of the plurality of future feedback periods based on the predicted channel responses;
to aggregate the feedback information for each of the plurality of future feedback periods into an aggregated information block; and
to code the aggregated information block into a single transmission block to be transmitted to the base station in an uplink data channel.

10. The article as defined in claim 9, wherein the instructions are further configured to enable the communication module to sample another plurality of channel responses at a second plurality of points in time preceding the first plurality of points in time, and to predict the plurality of channel responses based at least in part on the sampled another plurality of channel responses.

11. The article as defined in claim 9, wherein the feedback information includes at least two types of feedback information selected from a group consisting of channel quality feedback, power control feedback, and beamforming feedback.

12. The article as defined in claim 11, wherein the instructions are further configured to compress the aggregated information block.

13. A method comprising:
receiving by a base station a single transmission block over an uplink data channel, the single transmission block including aggregated feedback information from a subscriber station, the aggregated feedback information comprising feedback information for a plurality of future feedback periods;
recovering by the base station, the feedback information; and
transmitting a downlink transmission to the subscriber station based on the feedback information.

14. The method as defined in claim 13, further comprising beamforming by the base station based at least in part on the recovered feedback information; and transmitting the downlink transmission based on the beamforming.

15. The method as defined in claim 13, further comprising selecting by the base station at least one of a modulation or coding scheme based at least in part on the recovered feedback information; and transmitting the downlink transmission based on the selected at least one of the modulation or coding scheme.

16. A system comprising:
a plurality of antennas;
a memory;
a processor coupled to the memory; and
a communication module coupled to the processor and the plurality of antennas, configured
to predict for the system a plurality of channel responses for a first plurality of points in time corresponding to a plurality of future feedback periods for the system to provide feedback to a base station; and
to generate feedback information for each of the plurality of future feedback periods based on the predicted channel responses, to aggregate the feedback information for each of the plurality of future feedback periods into an aggregated information block, and to code the aggregated information block into a single transmission block to be transmitted, to the base station, in an uplink data channel over the plurality of antennas.

17. The system as defined in claim 16, wherein the communication module is further configured to sample another plurality of channel responses at a second plurality of points in time preceding the first plurality of points in time, and to predict the plurality of channel responses based at least in part on the sampled another plurality of channel responses.

18. The system as defined in claim 16, wherein the feedback information includes at least two types of feedback information selected from a group consisting of channel quality feedback, power control feedback, and beamforming feedback.

19. The system of claim 16, wherein the feedback information includes beamforming vector feedback and a modulation scheme selection.

20. The system of claim 16, wherein the plurality of antennas comprise a plurality of omnidirectional antennas configured for multiple-input, multiple-output operation.

21. The system of claim 16, wherein the system is a selected one of a desktop computer, a laptop computer, a handheld computer, a tablet computer, a cellular telephone, a pager, an audio player, a video player, a gaming device, a video camera, a digital camera, a navigation device, a printer, a scanner, or a medical device.

* * * * *

UNITED STATES PATENT AND TRADEMARK OFFICE
CERTIFICATE OF CORRECTION

| | | |
|---|---|---|
| PATENT NO. | : 7,778,599 B2 | Page 1 of 1 |
| APPLICATION NO. | : 11/617403 | |
| DATED | : August 17, 2010 | |
| INVENTOR(S) | : Li et al. | |

It is certified that error appears in the above-identified patent and that said Letters Patent is hereby corrected as shown below:

Column 9
Lines 10-11, "...beamforminq feedback." should read --...beamforming feedback.--.

Column 9
Line 17, "...to jointly code..." should read --...to code....--.

Signed and Sealed this
Eleventh Day of September, 2012

David J. Kappos
*Director of the United States Patent and Trademark Office*